US009262853B2

(12) United States Patent
Mitchell et al.

(10) Patent No.: US 9,262,853 B2

(45) Date of Patent: Feb. 16, 2016

(54) VIRTUAL SCENE GENERATION BASED ON IMAGERY

(71) Applicant: Disney Enterprises, Inc., Burbank, CA (US)

(72) Inventors: Kenneth Mitchell, Earlston (GB); Gwyneth Bradbury, London (GB); Tim Alexander Weyrich, London (GB)

(73) Assignee: Disney Enterprises, Inc., Burbank, CA (US)

( * ) Notice: Subject to any disclaimer, the term of this patent is extended or adjusted under 35 U.S.C. 154(b) by 377 days.

(21) Appl. No.: 13/931,255

(22) Filed: Jun. 28, 2013

(65) Prior Publication Data

US 2014/0267393 A1 Sep. 18, 2014

Related U.S. Application Data

(60) Provisional application No. 61/799,860, filed on Mar. 15, 2013.

(51) Int. Cl.
*G09G 5/00* (2006.01)
*G06T 11/60* (2006.01)

(52) U.S. Cl.
CPC ..................................... *G06T 11/60* (2013.01)

(58) Field of Classification Search
None
See application file for complete search history.

(56) References Cited

U.S. PATENT DOCUMENTS

| | | | | |
|---|---|---|---|---|
| 5,179,638 A | 1/1993 | Dawson et al. | | |
| 7,034,841 B1 | 4/2006 | Weiblen et al. | | |
| 7,554,540 B2 | 6/2009 | Hayes | | |
| 7,983,486 B2 | 7/2011 | Zhou | | |
| 8,145,677 B2 | 3/2012 | Al-Shameri | | |
| 8,289,326 B2 | 10/2012 | Couvillion et al. | | |
| 9,135,747 B2 * | 9/2015 | Berechet | G06T 17/05 | |
| 2009/0046931 A1 * | 2/2009 | Xiao | G06K 9/38 | 382/180 |
| 2010/0278420 A1 | 11/2010 | Shet et al. | | |
| 2011/0181589 A1 | 7/2011 | Quan et al. | | |
| 2013/0315477 A1 * | 11/2013 | Murray | G06F 17/30247 | 382/159 |

OTHER PUBLICATIONS

Xiao, Jianxiong et al., Image-based Facade Modeling, Proceedings of SIGGRAPH Asia, Dec. 2008, vol. 27, Issue 5, ACM, New York, United States.

Vanegas, Carlos A., et al., Visualization of Simulated Urban Spaces: Inferring Parameterized Generation of Streets, Parcels, and Aerial Imagery, IEEE Transactions on Visualization and Computer Graphics, May 2009, vol. 15, Issue 3, IEEE, Piscataway, United States.

Poullis, Charalambos et al., 3D Reconstruction of Urban Areas, 2011 International Conference on 3D Imaging, Modeling, Processing, Visualization and Transmission, May 2011, IEEE, Piscataway, United States.

Lin, Haobo et al., Landscape structure based super-resolution mapping from remotely sensed imagery, 2011 IEEE International Geoscience and Remote Sensing Symposium, Jul. 2011, IEEE, Piscataway, United States.

* cited by examiner

*Primary Examiner* — Ryan R Yang

(74) *Attorney, Agent, or Firm* — Patterson + Sheridan, LLP

(57) ABSTRACT

Techniques are disclosed for virtual scene generation. An image depicting a scene and annotated by a sparse set of labels is received. A dense set of labels annotating the image and a density map associated with the image are generated based on the sparse set of labels. A virtual scene is generated based on the dense set of labels and the density map, and the virtual scene is output.

20 Claims, 13 Drawing Sheets
(7 of 13 Drawing Sheet(s) Filed in Color)

1100

START

1102 RECEIVE AN AERIAL IMAGE OF A SCENE ANNOTATED BY A SPARSE SET OF LABELS

1104 EXTRACT ONE OR MORE FEATURE VECTORS FROM THE IMAGE BASED ON THE SPARSE OF LABELS, WHERE THE ONE OR MORE FEATURE VECTORS ARE SUBMITTED TO A CLASSIFIER CONFIGURED TO PROPAGATE THE SPARSE SET OF LABELS IN THE SCENE BASED ON THE ONE OR MORE FEATURE VECTORS IN ORDER TO GENERATE A DENSE SET OF LABELS ANNOTATING THE IMAGE AND A DENSITY MAP ASSOCIATED WITH THE IMAGE

1106 GENERATE ONE OR MORE PROBABILITY MAPS BASED ON THE SPARSE SET OF LABELS, THE DENSE SET OF LABELS, AND THE DENSITY MAP

1108 GENERATE A VIRTUAL SCENE BASED ON THE ONE OR MORE PROBABILITY MAPS, WHERE THE VIRTUAL SCENE IS OUTPUT

END

1300

VIRTUAL SCENE GENERATION BASED ON IMAGERY

BACKGROUND

A virtual world is a simulated environment in which users may interact with virtual objects and locations of the virtual world. Each user may control a respective avatar through which the user may interact with other users' avatars in the virtual world. An avatar generally provides a graphical representation of an individual within the virtual world environment. Avatars are usually presented to other users as two or three-dimensional graphical representations that resembles a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like.

Some virtual worlds are described as being persistent. A persistent world provides an immersive environment (e.g., a fantasy setting used as a setting for a role-playing game, or a virtual world complete with land, buildings, towns, and economies) that is generally always available and where events continue to occur regardless of the presence of a given avatar. Thus, unlike more conventional online games or multi-user environments, the virtual world continues to exist and plots and events continue to unfold as users enter (and exit) the virtual world. Virtual environments are presented as images on a display screen and some virtual environment may allow users to record events that occur within the virtual environment.

SUMMARY

Embodiments presented in this disclosure provide a computer-implemented method of scene generation. The method includes receiving an image depicting a scene and annotated by a sparse set of labels. The method also includes generating, based on the sparse set of labels, a dense set of labels annotating the image and a density map associated with the image. The method also includes generating a virtual scene based on the dense set of labels and the density map, where the virtual scene is output.

Other embodiments presented in this disclosure provide a computer-readable medium for scene generation and containing a program which, when executed, performs an operation that includes receiving an image depicting a scene and annotated by a sparse set of labels. The operation also includes generating, based on the sparse set of labels, a dense set of labels annotating the image and a density map associated with the image. The operation also includes generating a virtual scene based on the dense set of labels and the density map, where the virtual scene is output.

Still other embodiments presented in this disclosure provide a system for scene generation. The system includes one or more computer processors and a memory containing a program which, when executed by the one or more computer processors, is configured to perform an operation that includes receiving an image depicting a scene and annotated by a sparse set of labels. The operation also includes generating, based on the sparse set of labels, a dense set of labels annotating the image and a density map associated with the image. The operation also includes generating a virtual scene based on the dense set of labels and the density map, where the virtual scene is output.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features, advantages and objects of embodiments presented in this disclosure are attained and can be understood in detail, a more particular description of the embodiments, briefly summarized above, may be had by reference to the embodiments thereof which are illustrated in the appended drawings.

It is to be noted, however, that the appended drawings illustrate only typical embodiments disclosed herein and are therefore not to be considered limiting of its scope, for the disclosure may admit to other equally effective embodiments.

Figure 1:
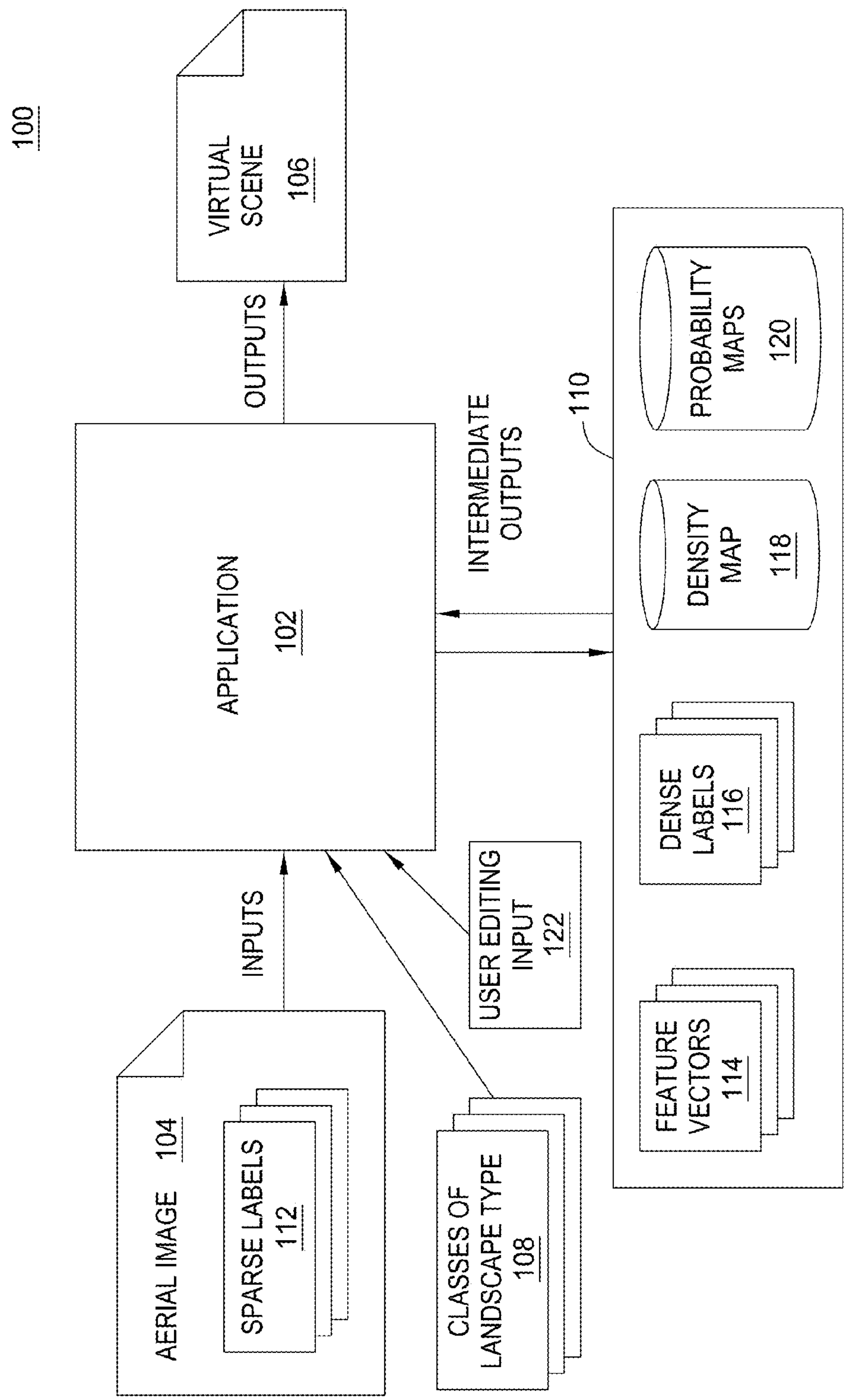

FIG. 1 is a data flow diagram illustrating an application for scene generation based on aerial images, according to one embodiment presented in this disclosure.

Figure 2:
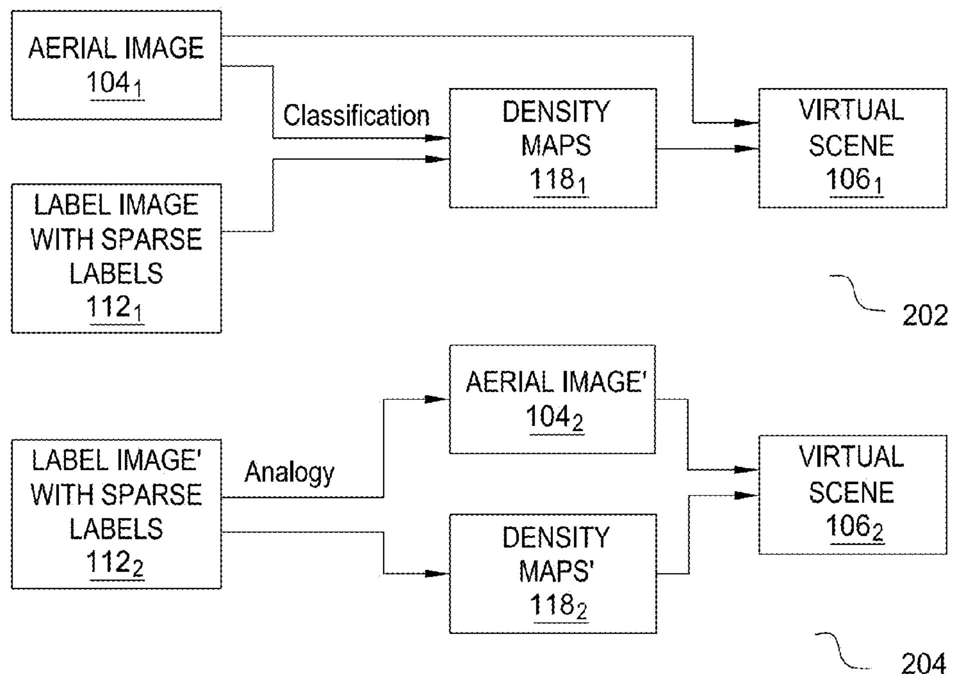

FIG. 2 depicts a workflow for scene generation based on aerial images, according to one embodiment presented in this disclosure.

Figure 3:
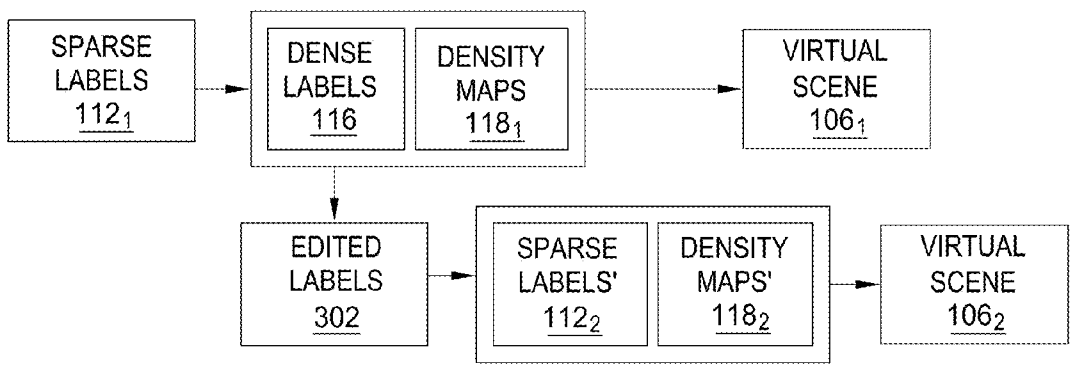

FIG. 3 depicts a workflow for generating modified virtual scenes based on label editing specified by user input, according to one embodiment presented in this disclosure.

Figure 4:
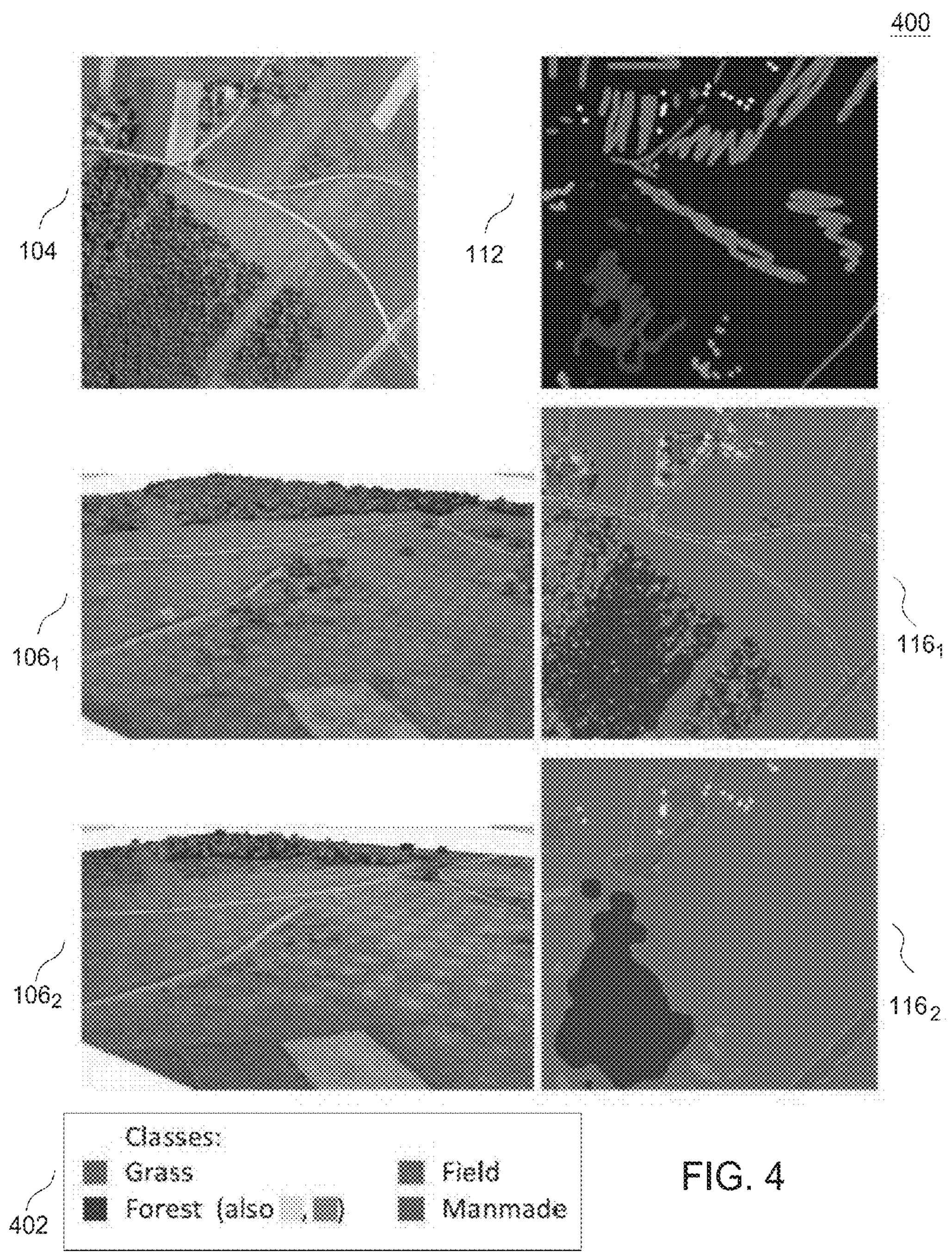

FIG. 4 illustrates example images comparing use of probability maps versus in-painting for generating virtual scenes, according to one embodiment presented in this disclosure.

Figure 5:
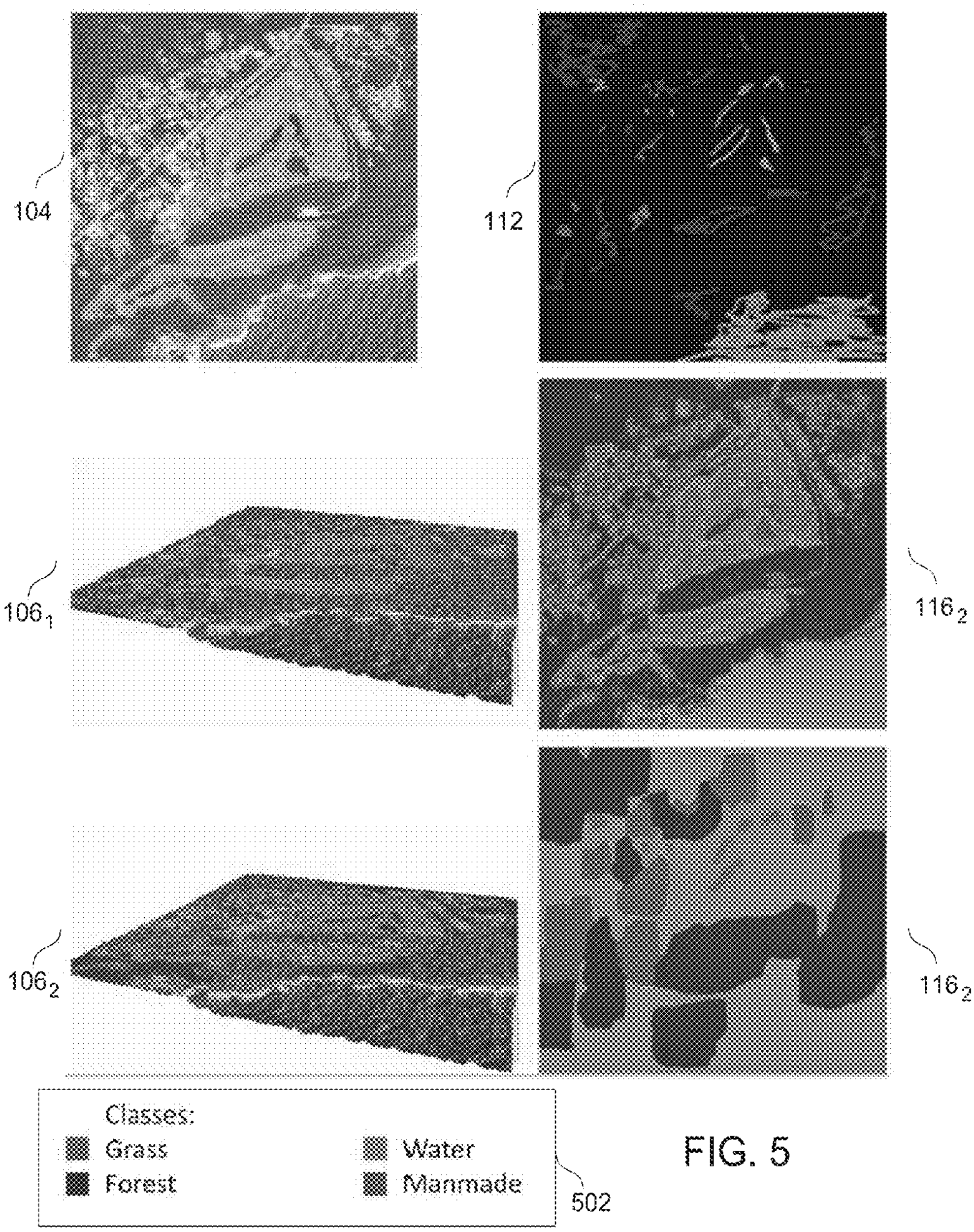

FIG. 5 illustrates additional example images comparing use of probability maps versus in-painting for generating virtual scenes, according to one embodiment presented in this disclosure.

Figure 6:
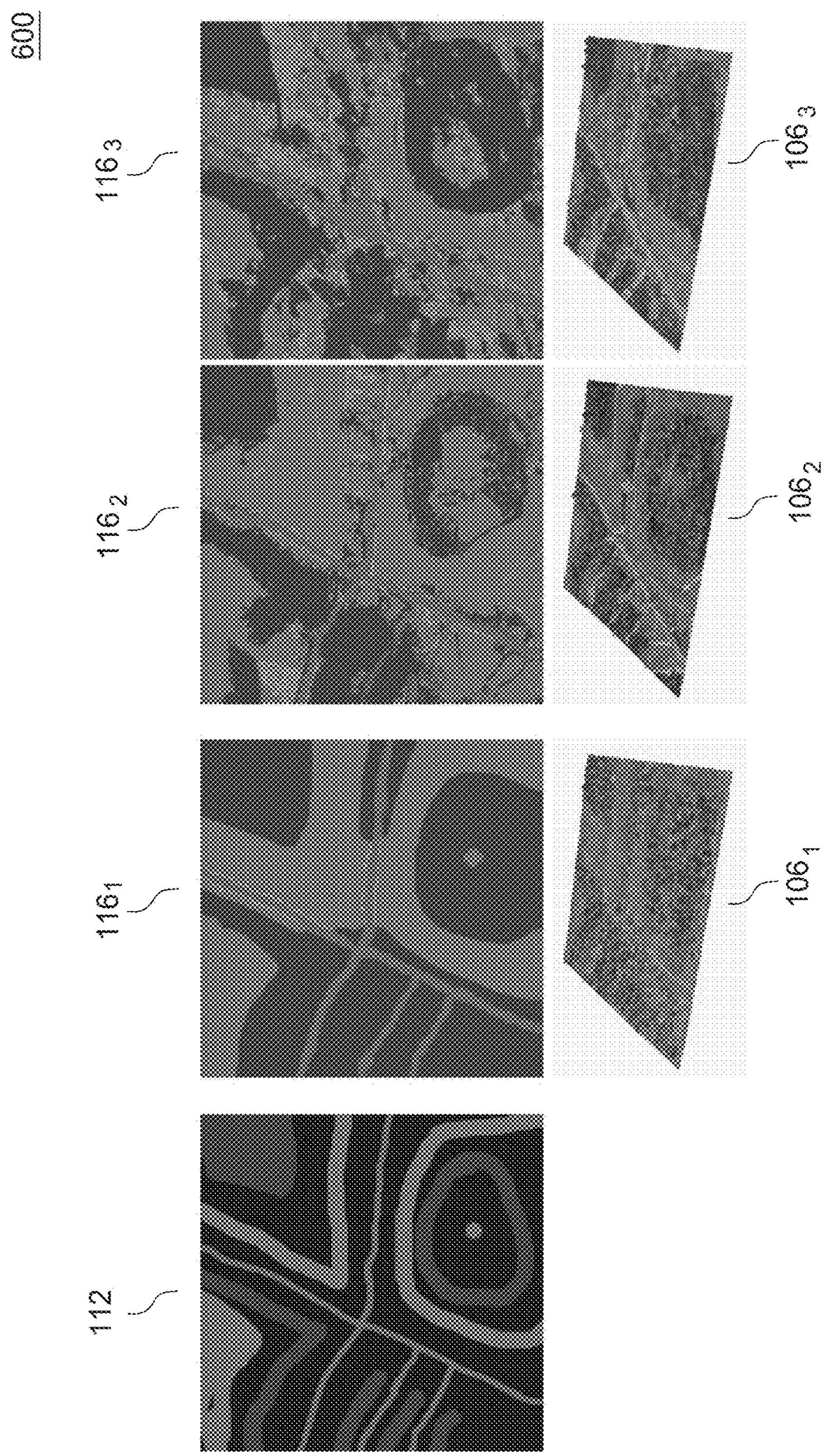

FIG. 6 illustrates example images comparing techniques for obtaining dense labels based on sparse user input, according to one embodiment presented in this disclosure.

Figure 7:
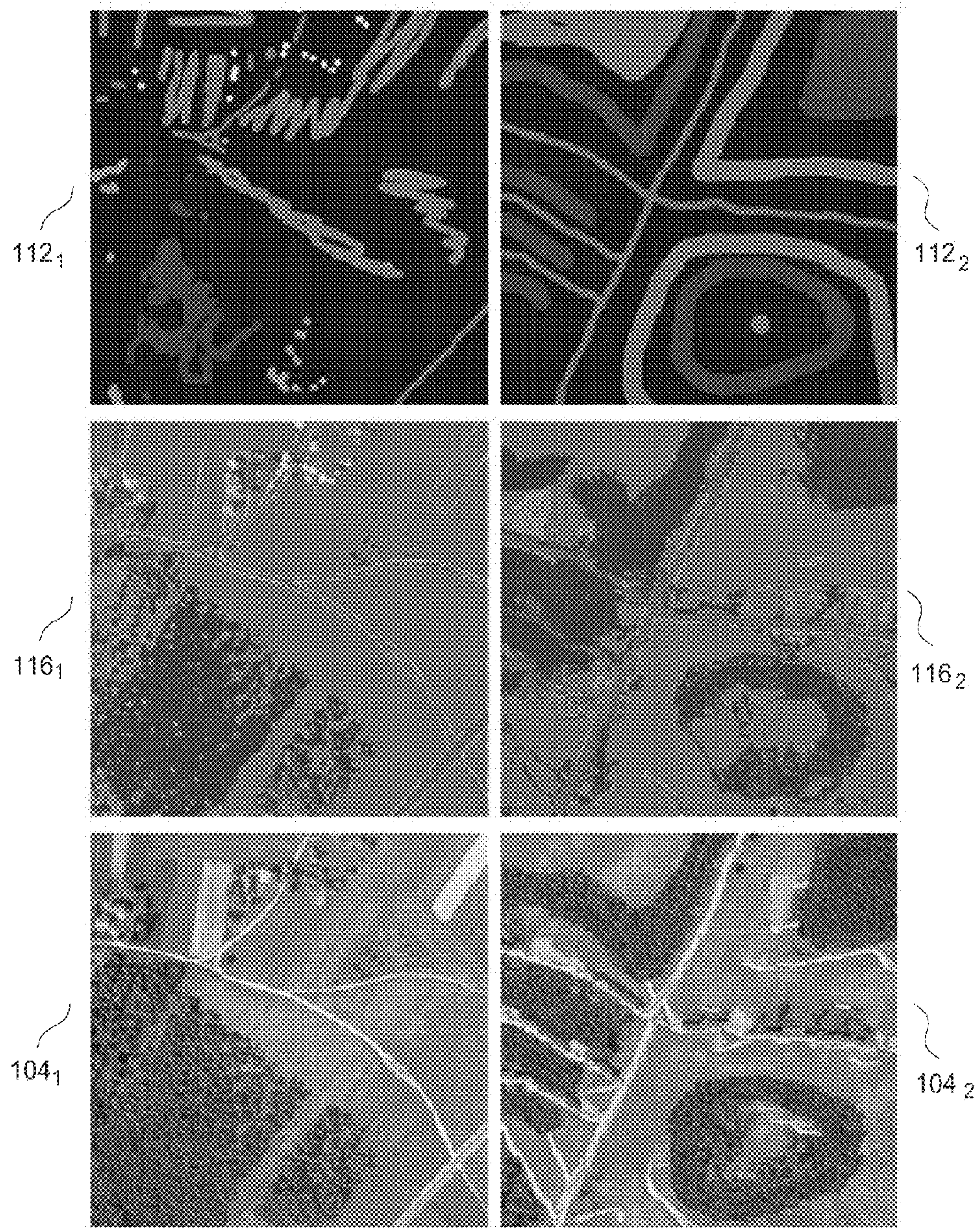

FIG. 7 illustrates example images pertaining to synthesizing new label and aerial images by image analogy, according to one embodiment presented in this disclosure.

Figure 8:
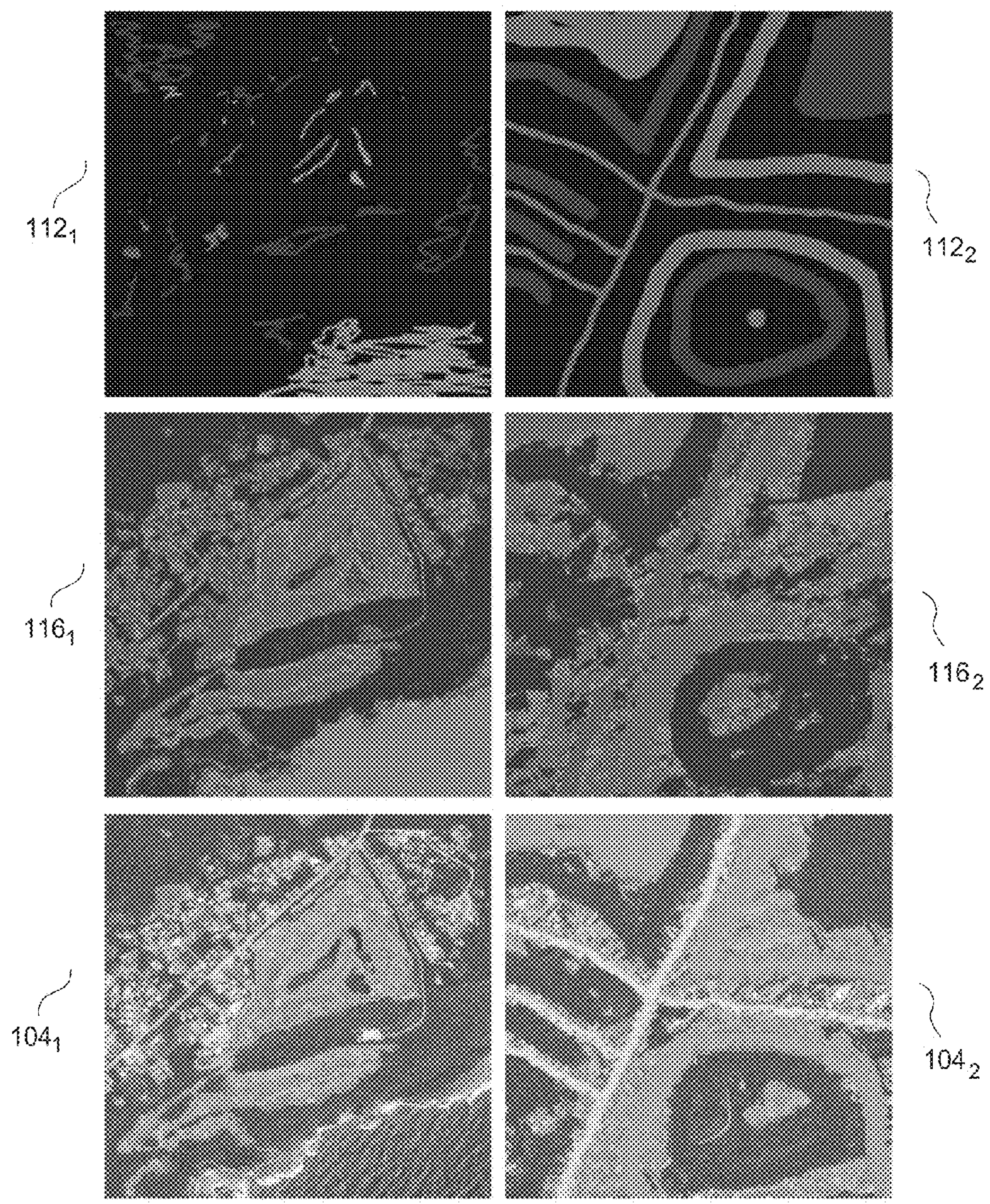

FIG. 8 illustrates additional example images pertaining to synthesizing new label and aerial images by image analogy, according to one embodiment presented in this disclosure.

Figure 9:
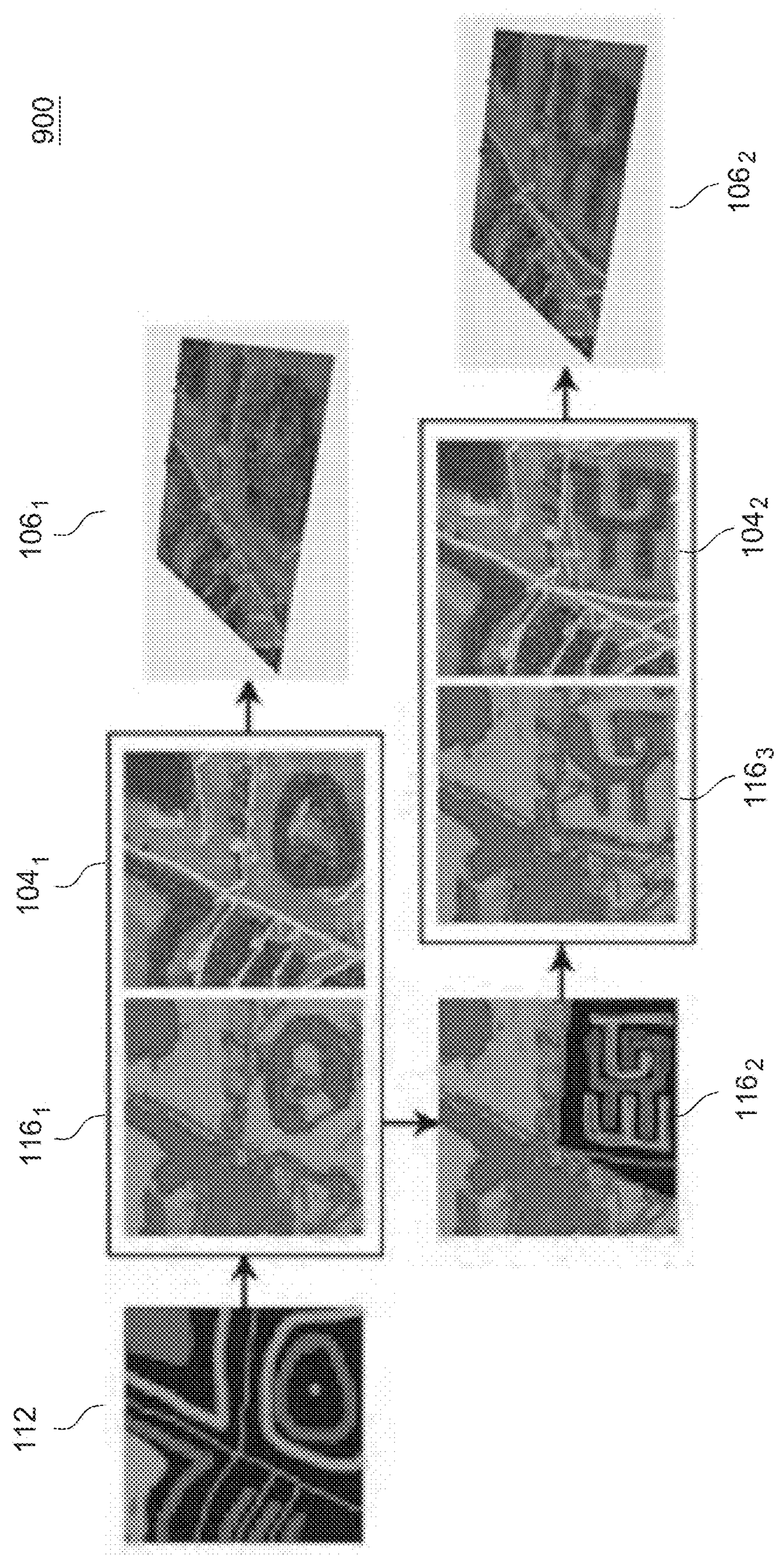

FIG. 9 illustrates example images pertaining to virtual scene generation based on user editing and image analogy, according to one embodiment presented in this disclosure.

Figure 10:
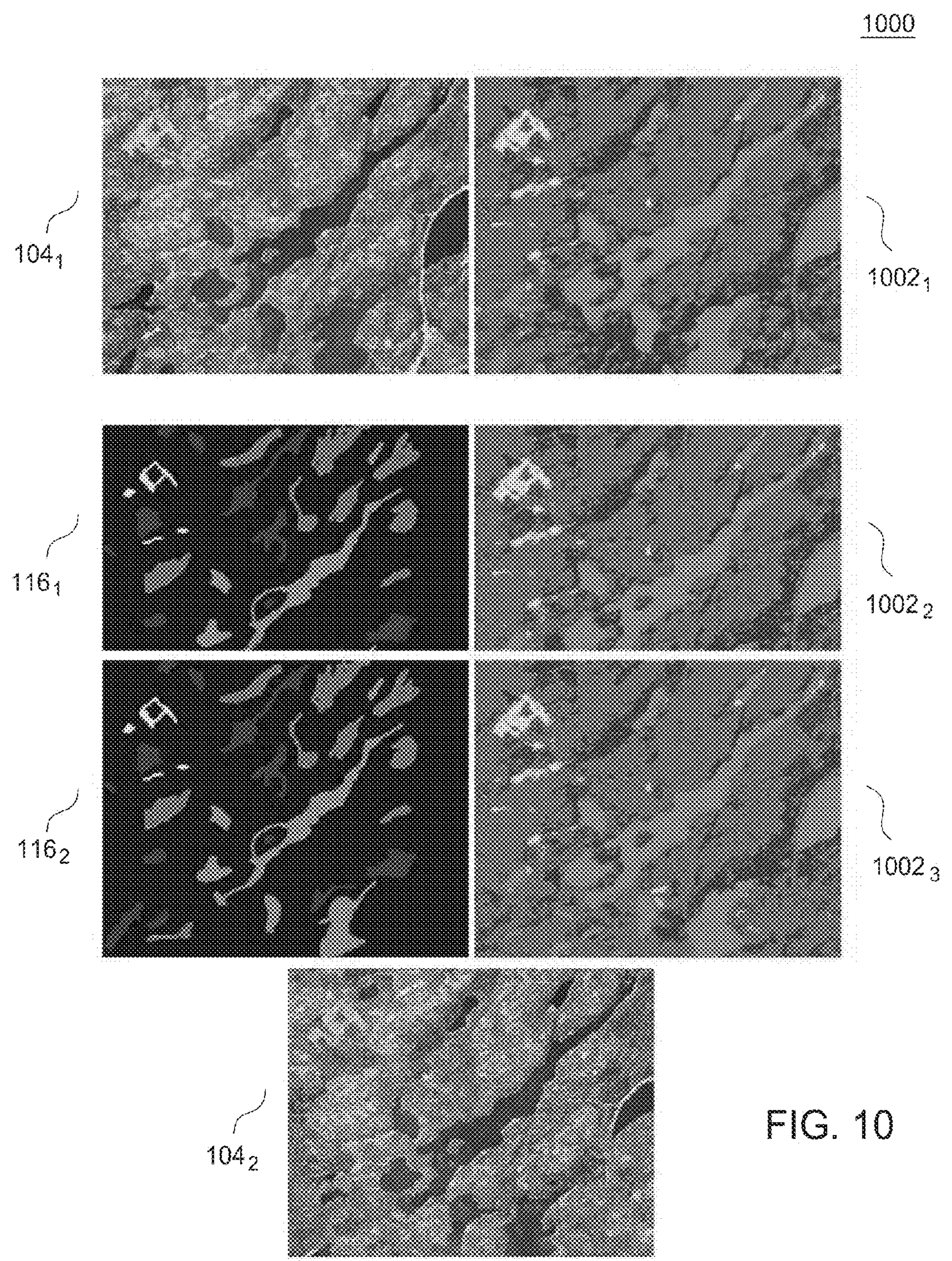

FIG. 10 illustrates example images pertaining to synthesizing missing image regions, according to one embodiment presented in this disclosure.

Figure 11:
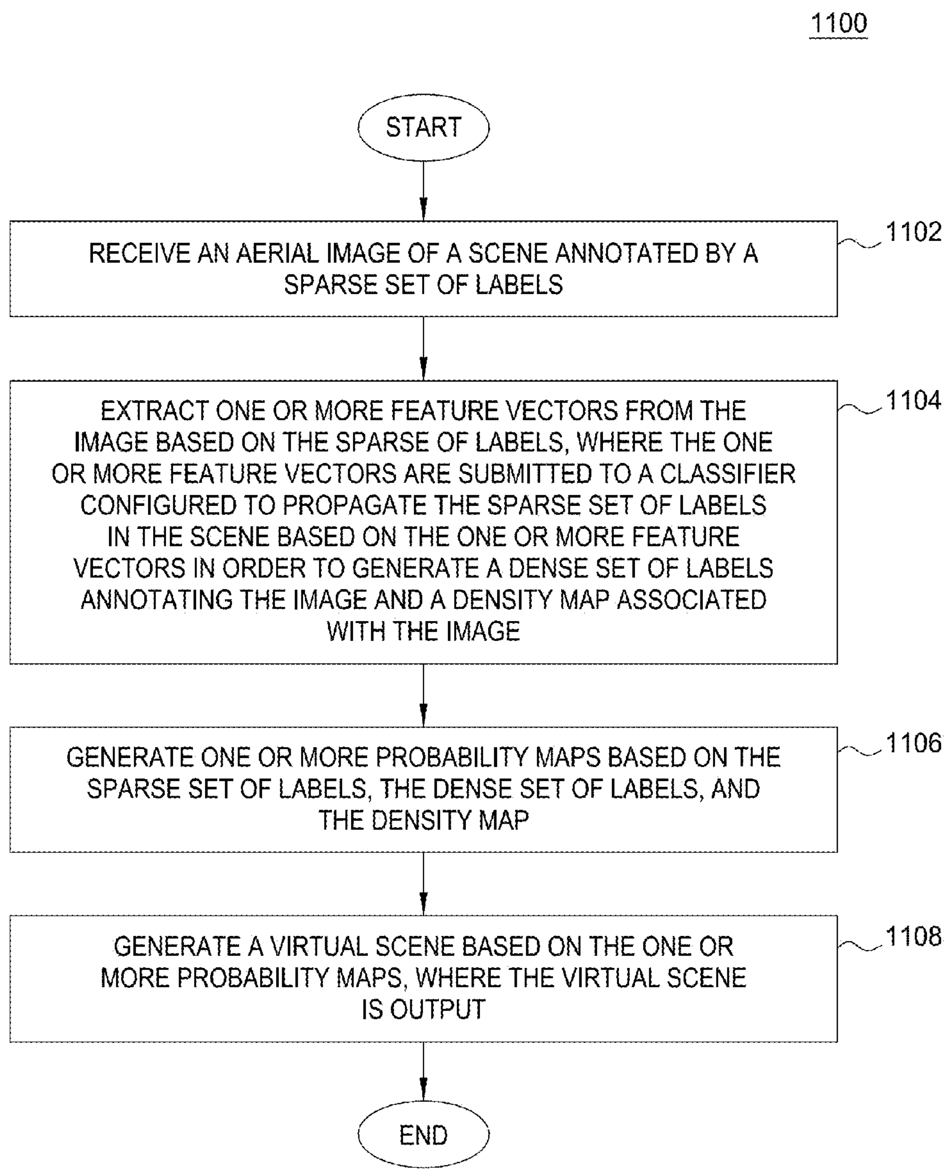

FIG. 11 is a flowchart depicting a method of scene generation based on aerial images, according to one embodiment presented in this disclosure.

Figure 12:
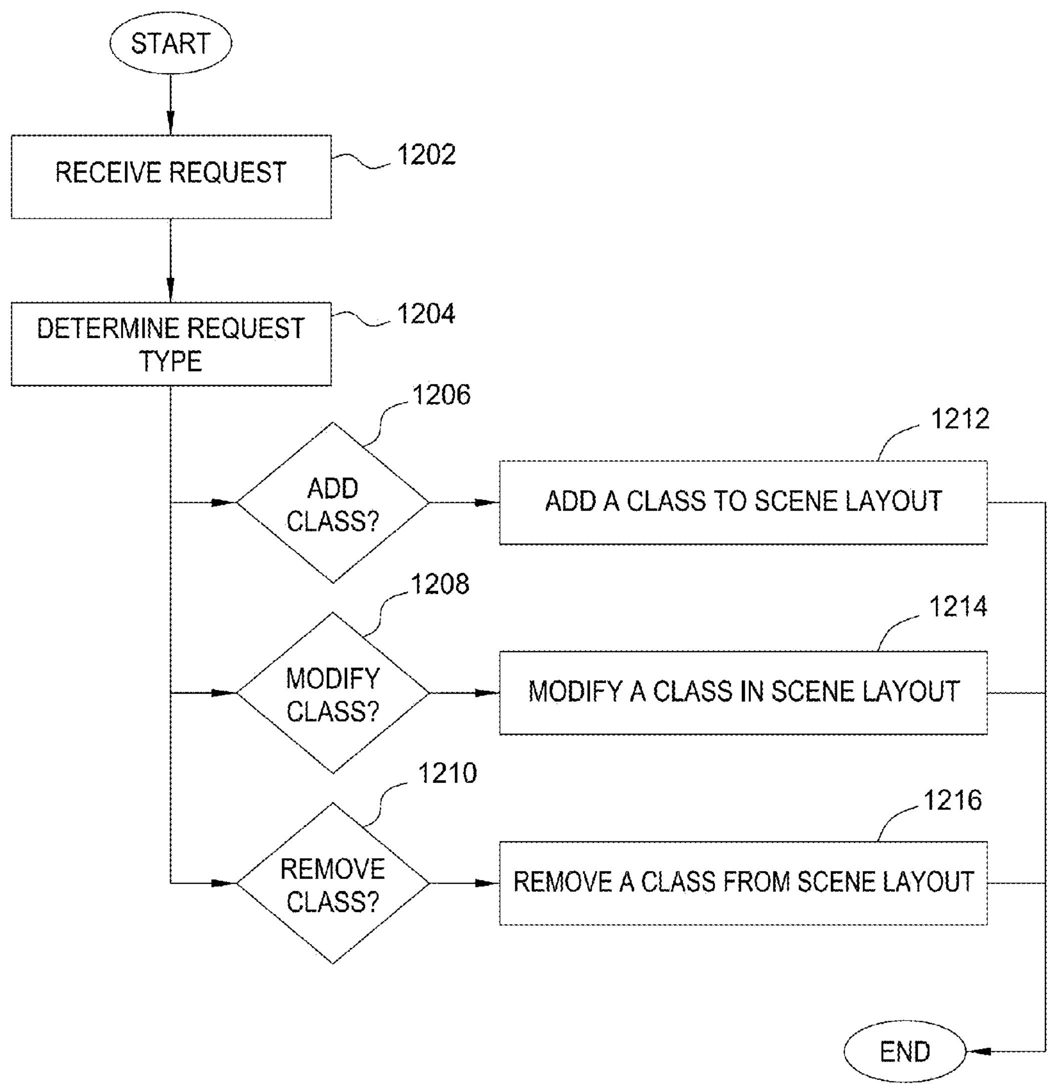

FIG. 12 is a flowchart depicting a method for customizing a scene layout based on user input, according to one embodiment presented in this disclosure.

Figure 13:
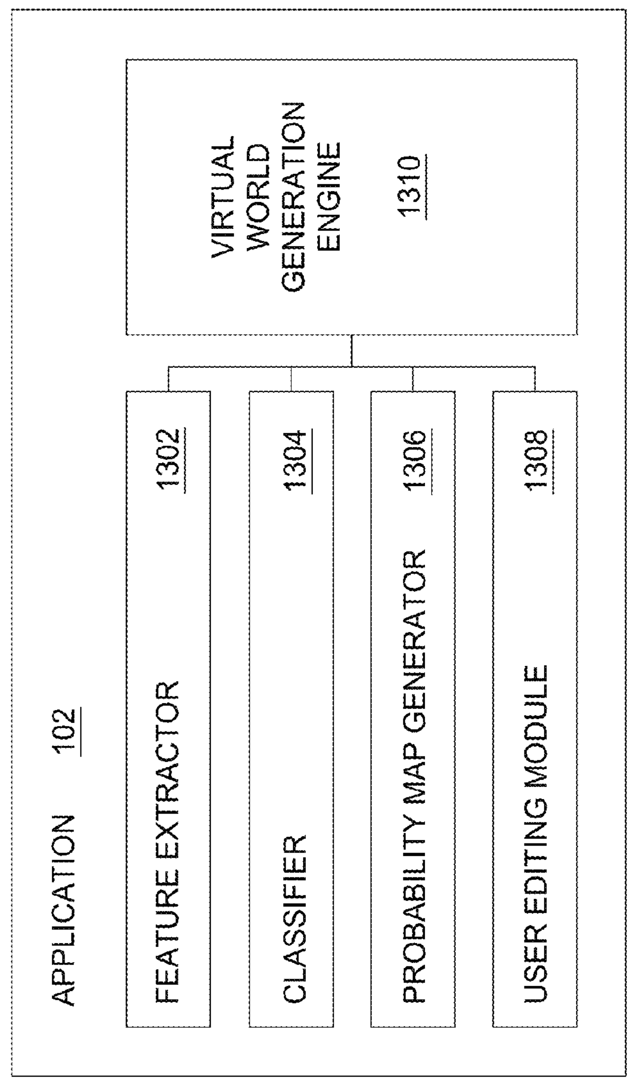

FIG. 13 is a block diagram illustrating components of an application for scene generation based on aerial images, according to one embodiment presented in this disclosure.

Figure 14:
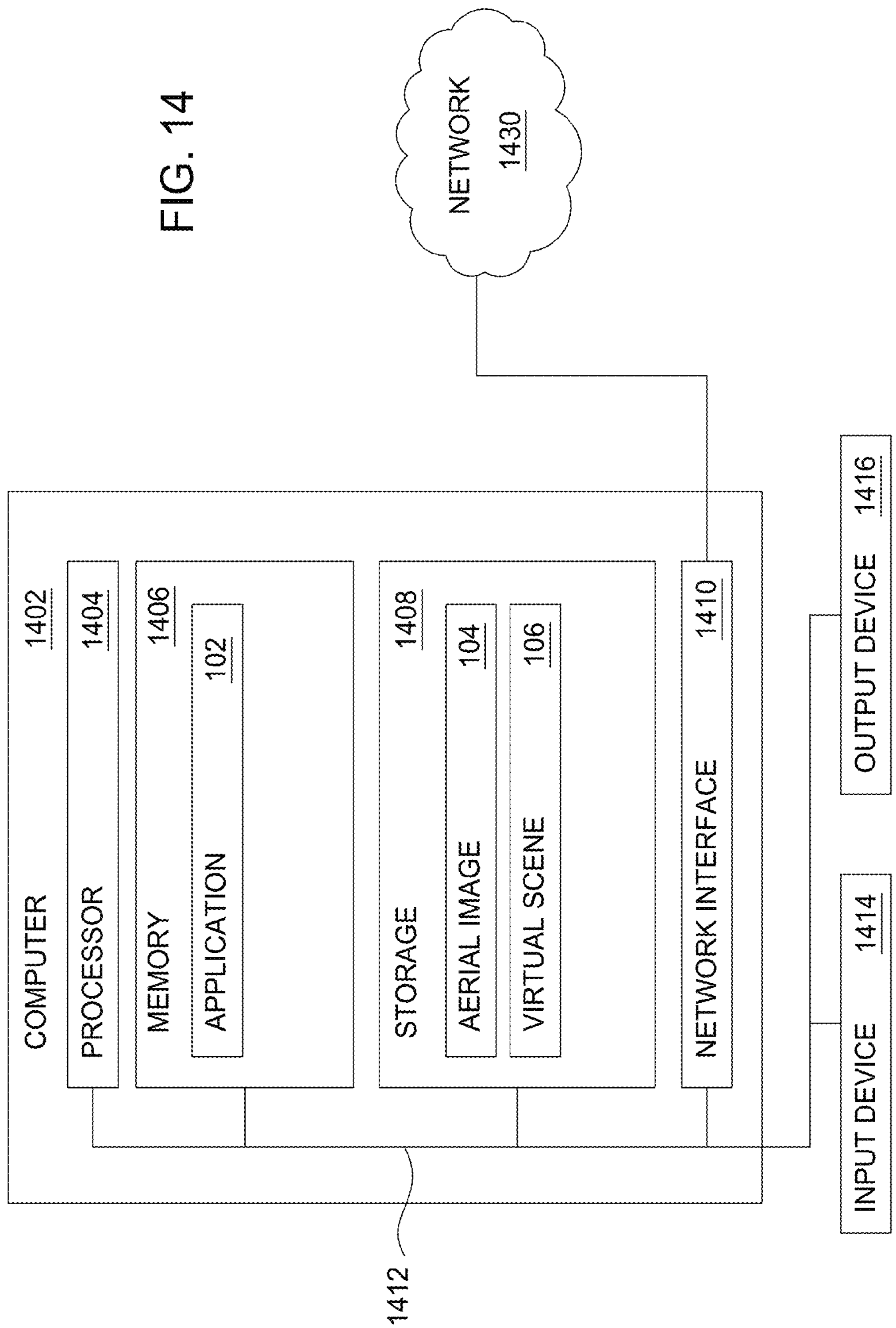

FIG. 14 is a block diagram illustrating a networked system for scene generation based on aerial images, according to one embodiment presented in this disclosure.

DETAILED DESCRIPTION

As the demand for high-quality, complex virtual worlds continues to increase, the challenges associated with content creation are becoming similarly demanding across different scales of virtual environments. While it may often be important for aspects of virtual environments to be designed by hand in order to improve scene variance and diversity, such labor may often become a bottleneck in the creative pipeline. As a result, labor costs associated with creating virtual worlds may often prove to be a determining cost factor. Further, in some scenarios, it may be desirable to create virtual environments based on aspects of the physical world.

Accordingly, at least some embodiments herein provide techniques for at least partially automating generation of virtual scenes while still allowing users, such as artists, to maintain some individual control over aspects of generated virtual scenes. The virtual scenes may be generated based on images, such as those depicting scenes in the physical world. In some embodiments, the virtual scenes are generated based on aerial views of the scenes, also referred to herein as aerial images. As used herein, an aerial image of a scene refers to an image of a scene taken from a predefined altitude. In one embodiment, the predefined altitude may be any altitude greater than or equal to a threshold altitude. Although embodiments are herein described with reference to aerial images as a particular example, other images are broadly contemplated. For example, in alternative embodiments, images depicting views of a scene from any perspective, including non-aerial perspectives, may be used according to the techniques disclosed herein.

In some embodiments, regardless of the particular perspective, the images are used as a basis for distributing natural objects throughout a scene. Further, classification techniques may be used to extract meaningful information and create probability maps from these images. The probability maps may then be used to drive a procedural modeling approach, and texture synthesis may be used to generate virtual scenes based on sparsely-annotated maps. The virtual scenes may resemble, at least to a given extent, the scene in the physical world as depicted in the aerial image. In one embodiment, scene depicted in the physical world is a landscape in the physical world, and the virtual scene that is generated is a virtual landscape.

Consequently, the techniques disclosed herein may be used to generate virtual scenes that are more cost-efficient and/or compelling in some cases, at least relative to alternative approaches of creating virtual scenes. For example, an alternative approach includes procedural techniques that allow artists a global control over the look of an object or scene while limiting local control of geometry. Such an alternative approach may be used for tasks ranging from modeling trees and cities to modeling room layouts. However, the alternative approach may have poor support for scene editing once the scene has been generated and may often limit inputs to a set of controls that may often be non-intuitive to the end-user.

For natural landscape scenes, procedural generation may be used to create the terrain relief and decide placement of objects such as forests in the scene. While procedural generation may lead to realistic results in some cases, procedural generation often lacks controllability. For example, it may often not be feasible to drive such systems using real-world data, such as where a real-world landscape is desired to be recreated for use by a flight simulator application.

For virtual landscapes, geometry placement within a scene may be controlled by probability density maps. Doing so give artists control over the global distribution of objects while also allowing some local control of the details. One way to obtain the probability density maps is by processing aerial images. In one alternative approach, stochastic distributions may be extracted from the aerial images and used to guide a procedural technique that involves applying an image analogy to a new set of sparse labels, also referred to herein as rough labels. An image analogy refers to a technique of programmatically learning an image relationship or transformation based on training data. For instance, a relationship between an image and a variation thereof may be learned. The relationship may be applied to a next image to generate a variation thereof. Accordingly, label maps may be edited in an intuitive way before the virtual landscape is generated.

Although the emergence of procedural content creation tools and the continually increasing demand for detail may constitute strong incentives for artists to use procedural techniques in creating virtual scenes, procedural content creation often represents only a relatively insignificant part of the creative pipeline. Such content creation tools often leave much to be desired in terms of natural control afforded to a user. Control of input parameters may often be unintuitive and may impact the final result in unexpected ways. Further, content creation tools that provide parametric control often generate results that are difficult to tweak or edit without regenerating the desired scene. In some cases, small changes to the input parameters may have an unexpectedly large impact on the output.

Alternative approaches that use statistical distribution techniques to generate virtual scenes may often yield virtual scenes that are visually compelling and varied, such as when fractal distributions are used to create infinite terrain maps. Accordingly, at least some embodiments herein take into account realistic statistical distributions representing the real world, in generating virtual scenes. Further, object distribution in a scene may be treated as a non-stationary texture, and virtual scenes may be generated by applying image analogies to real-world data represented by the aerial images. At least some techniques disclosed herein process a labeled image in order to create a realistic scene containing multiple, textured regions. In some embodiments, the labeled image may be processed using a texture-by-numbers technique. The texture-by-numbers technique may be based on image analogy and characterized by learning a relationship between a training image and an output image. In one embodiment, the relationship may be learned according to a predefined framework, such as a multi-scale auto-regression framework. Once learned, the relationship may then be applied to a next input image to generate a next output image.

In some embodiments, virtual scenes generated according to the techniques presented herein represent a natural-looking environment that incorporates stochastic aspects observed in the real-world counterparts of the virtual scenes. Generating virtual scenes according to the techniques disclosed herein may also facilitate allowing users to modify aspects of the virtual scenes based either directly on the aerial images or on distribution information extracted therefrom. Examples of use case scenarios in which the techniques disclosed herein may be applied include adaptive or dynamic game content generation, outdoor training such as flight simulators, ecosystem modeling and visualization, etc.

In one embodiment, to facilitate generating virtual scenes, a sparsely annotated control map may first be generated based on user input. The control map may then be used to control non-stationary textures observed in real-world scenes. Texture synthesis in this regard may rely on a random initialization followed by an optimization based on a multi-scale auto-regression. In some embodiments, by varying the random initialization, an arbitrarily large number of solutions may be generated, each of which represents the input. Further, by applying the texture-by-numbers technique to sparse labels, more realistic boundaries may be obtained between different classes of landscape types. Accordingly, it may remain relatively convenient for users to edit the input map in order to adjust the resulting virtual scene in a desired manner. Examples of different classes of landscape types include grass, forest, field, water, and man-made landscape. In some embodiments, one or more of the landscape types may be predefined.

In one embodiment, to generate virtual scenes from aerial images, probabilistic class maps may first be generated from the aerial images. The probabilistic class maps may represent a real scene and may provide results that are more natural from a visual perspective than at least some alternative approaches, such as those that involve applying in-painting to the sparse image labels. An image analogy may then be applied in order to transfer stochastic distributions of the classes present in the aerial images, to new, user-annotated, sparse maps. Stated differently, texture synthesis may be used to imitate the random forest learning of class labels in the aerial images. Thus, virtual scenes may be created that contain statistical distributions of objects, that are similar to those of a corresponding scene in the real world. Hence, aerial images, such as satellite imagery, may be used to drive a procedural virtual scene generation work-flow. Generating virtual scenes using the techniques disclosed herein also facilitates convenient manipulation of the final result, because users may modify the labeling in such a manner that only a limited area of the new scene map needs to be re-synthesized.

FIG. 1 is a data flow diagram 100 illustrating an application 102 for scene generation based on aerial images, according to one embodiment presented in this disclosure. In one embodiment, the application 102 is configured to generate a virtual scene 106 based on an aerial image 104. The aerial image 104 depicts a scene and is annotated by a sparse set of labels, also referred to herein as sparse labels 112 or rough labels. The sparse labels 112 may be generated based on user input. In some embodiments, to generate the virtual scene 106, the application 102 may first generate one or more intermediate outputs 110. One or more of the intermediate outputs 110 may, in turn, be used to generate the virtual scene 106. Examples of the intermediate outputs 110 include feature vectors 114, a dense set of labels, density map 118, and probability maps 120. Additionally or alternatively, the application 102 may accept one or more additional inputs, such as classes 108 of landscape type and user editing input 122. The dense set of labels may also be referred to as dense labels 116 or fine labels. Operation of the application 102 is described in further detail below in conjunction with FIGS. 2-14.

FIG. 2 depicts a workflow 200 for scene generation based on aerial images, according to one embodiment presented in this disclosure. As shown, the workflow 200 includes a first phase 202 for generating virtual scenes based on aerial images and a second phase 204 for using image analogies to imitate random forest classification. In one embodiment, in the first phase 202, the aerial image 104$_1$ is first manually labeled using a sparse set of brush strokes, in order to create the sparse labels 112$_1$. Depending on the embodiment, the labels may be stored as annotations to, or metadata associated with the aerial image 104$_1$. In some embodiments, the labels may be stored as a data structure separate from the aerial image 104$_1$. The data structure may also be referred to as a label image. The application 102 then extracts features from the aerial image 104$_1$ and performs sampling based on the labeled points in the aerial image 104$_1$. At least in some embodiments, the features may be extracted in the form of feature vectors.

In one embodiment, the feature vectors and associated labels are submitted to a classifier. An example of the classifier is a random forest classifier. In some embodiments, the classifier may also be pixel-based. Once a sufficient number of feature vectors and associated labels is learnt by the classifier, the classifier is trained and can then propagate the labels through the scene in order to obtain a densely labeled image. At least in some embodiments, each pixel in the densely labeled image has an associated label and corresponds to a respective pixel in the aerial image. Additionally or alternatively, the classifier may also provide probabilities of each class of landscape type at each pixel. The probabilities constitute grayscale maps that may be regarded as representing the density distribution of each class of landscape type. The grayscale maps may also be referred to as density maps 118$_1$. The application 102 may then sample the grayscale maps in order to generate a three-dimensional virtual environment representing the physical scene depicted in the aerial image. The virtual environment may include a virtual scene 106$_1$ corresponding to and bearing at least some resemblance to the physical scene depicted in the aerial image 104$_1$. The virtual environment may be also combined with or modified using real or synthesized any available height-map data. Accordingly, the application 102 may generate virtual scenes that are more compelling and/or in a more cost-efficient manner in some cases, at least relative to alternative approaches such as one in which a content-aware fill is used to propagate labels over the aerial image. Such an alternative approach that involves in-painting may often produce blockier-looking results, and region of a given class of landscape type may lose structure and definition in comparison.

In one embodiment, the application 102 may use texture synthesis techniques to generate dense probability maps from the sparsely annotated scene layouts. To this end, in the second phase 204, the application 102 may apply the image analogy learned between the sparse labeling of the aerial image 104$_1$ and the probabilistic output from the classifier, where the probabilistic output includes the density maps 118$_1$. The learned image analogy may be applied to the new sparse labels 112$_2$ to produce a synthesized probability maps for each class of landscape type. The application 102 may then generate a finely-labeled scene layout based on a set of classes including, for each pixel, the class having the highest synthetic probability at the respective pixel. Doing so transfers stochastic properties from the aerial image to the sparsely labeled image. The application 102 may then match the new input labels to the stochastic density distributions, based on the example (label, probability) pair. The relationships between labels and probabilities may be applied in two distinct aerial images and to a new set of sparse labels, in order to generate dense probability maps based on the sparse input layout, and showing that two different scenes can be generated using the same new input. The dense probability maps may include the density maps 118$_2$ and may be used to generate a virtual scene 106$_2$ for the aerial image 104$_2$.

FIG. 3 depicts a workflow 300 for generating modified virtual scenes based on label editing specified by user input, according to one embodiment presented in this disclosure. In one embodiment, the techniques disclosed herein facilitate convenient editing of the virtual scene by editing parts of the input label image. As described above, the application 102 may generate dense labels 116 and density maps 118$_1$ based on sparse labels 112$_1$, and in turn generate the virtual scene 106$_1$. In one embodiment, by allowing the user to erase and re-label parts of the image having dense labels 116, thereby creating edited labels 302, the smaller, altered regions can be re-synthesized without having to re-synthesize the entire region. The probability maps, such as the density maps $118_2$, may then be used as input to a virtual world generation engine configured to sample the probability maps and insert appropriate geometry into the scene, thereby generating a different virtual scene $106_2$. Depending on the embodiment, the virtual world generation engine may be a predefined component of the application 102 or part or all of a separate application.

In one embodiment, the geometry includes geometric object models that are predefined and associated with each class of landscape type. In some embodiments, multiple different geometric object models may be associated with a given class of landscape type. Further, by applying the image analogy relationship between the sparse labels and aerial images, the application 102 may also generate a synthesized aerial image based on a new set of annotations. In some embodiments, the synthesized aerial image may be used as an albedo map for the generated scene in order to introduce a more natural color variation to the object models by adjusting material properties for each instance of the object model. In some embodiments, the albedo map represents differences in surface reflectivity in a desired surface. In one embodiment, the albedo map is a red, green, and blue (RGB) albedo map. The scene may also include procedurally generated tree models. In some embodiments, the parameters controlling tree shape may be determined by sampling maps similar to the probability distributions described above.

In one embodiment, using natural scene layouts as depicted in aerial images of physical scenes in generating virtual scenes may yield virtual scenes that are visually more realistic at least in some cases. The texture in a natural scene layout relates to ecosystem interactions and overlapping classes of landscape type and may often be a significant determining factor in the degree of realism of virtual scenes. In some embodiments, stochastic properties are transferred via image analogies in order to generate new virtual scenes. Although virtual landscapes may be readily and conveniently generated for different types of foliage classes, other virtual landscapes, such as those generated for man-made or artificial classes such as roads and buildings, may not necessarily be as readily generated at least in some cases. Such man-made classes exhibit a much stronger and inherent global structure, the scale of which texture synthesis techniques may not necessarily be equipped to adequately capture at least in some cases. Put another way, at least some texture synthesis techniques disclosed herein may in some cases be better suited for classes with a stochastic distribution rather than those involving a large scale or a global structure.

In some embodiments, the techniques disclosed herein may be adapted to target structural integrity across larger scales as well as ecosystems that exhibit similar characteristics as a result of an associated global infrastructure thereof. Further still, users may more easily alter distribution maps of a virtual scene without any need for fine-tuning of parameters. While the virtual scenes are generated by density maps for each class of landscape type, the user need only edit the label image in order to effect desired editing on the virtual scene.

Accordingly, by using the techniques disclosed herein, texture synthesis may be used to generate probability maps, which may in turn be used to generate virtual scenes. For example, aerial images may be used to reconstruct scenes either as partial input to a texture synthesis application or as direct input to a virtual world generation engine. When used as partial input to the texture synthesis application, statistical parameters may be extracted and transferred to a user-labeled map. Consequently, the application 102 may generate virtual scenes that are more cost-efficient and/or compelling at least in some cases.

FIG. 4 illustrates example images 400 comparing use of probability maps versus in-painting for generating virtual scenes, according to one embodiment presented in this disclosure. Stated differently, the example images 400 compare results of labeling images by classification versus by in-painting. In particular, the example images 400 depict a scenario in which a single aerial image is sparsely labeled and in which the labels are propagated over the image by using in-painting in one instance and by using classification in another instance, yielding respective, resulting virtual scenes. As shown, the example images 400 include a legend 402 showing classes of landscape types, such as grass, forest, field, and man-made types. The example images 400 also include inputs for virtual scene generation, such as the aerial image 104 and the sparse labels 112 specified based on user input. Using probability maps and random forest classification, the density map $116_1$ may be generated and in turn used to create the virtual scene $106_1$. On the other hand, when using in-painting, the density map $116_2$ may be generated and in turn used to create the virtual scene $106_2$. As shown, the virtual scene $106_1$ may be more compelling and/or cost-efficient to generate than the virtual scene $106_2$ at least in some cases. More specifically, in-painting may often need to an aesthetically less natural layout with texture-less class distributions. In use case scenarios where additional data is available, in-painting may yield even more inaccurate labeling, at least relative to classification. An example of additional data is ground-truth data, described below in conjunction with FIG. 10.

FIG. 5 illustrates additional example images 500 comparing use of probability maps versus in-painting for generating virtual scenes, according to one embodiment presented in this disclosure. Stated differently, the example images 500 compare results of labeling images by classification versus by in-painting. The example images 500 also depict a scenario in which a single aerial image is sparsely labeled and in which the labels are propagated over the image by using in-painting in one instance and by using classification in another instance, yielding respective, resulting virtual scenes. As shown, the example images 500 include a legend 502 showing classes of landscape types, such as grass, forest, water, and man-made types. The example images 500 also include inputs for virtual scene generation, such as the aerial image 104 and the sparse labels 112 specified based on user input. Using probability maps and random forest classification, the density map $116_1$ may be generated and in turn used to create the virtual scene $106_1$. On the other hand, when using in-painting, the density map $116_2$ may be generated and in turn used to create the virtual scene $106_2$. Once again, the virtual scene $106_1$ may be more compelling and/or cost-efficient to generate than the virtual scene $106_2$ at least in some cases. For instance, as stated above, in-painting may often need to an aesthetically less natural layout with texture-less class distributions.

FIG. 6 illustrates example images 600 comparing techniques for obtaining dense labels based on sparse user input, according to one embodiment presented in this disclosure. Stated differently, the example images 600 show results of transferring properties of one scene to a new label imager by in-painting and by image analogy, respectively. As shown, the example images 600 include the spare labels 112 as an input for virtual scene generation. Using in-painting techniques, the dense labels $116_1$ may be generated and in turn used to create the virtual scene $106_1$. On the other hand, when using image analogy techniques based on training data associated with the example images 400 of FIG. 4, the dense labels $116_2$ may be generated and in turn used to create the virtual scene $106_2$. Still alternatively, when using image analogy techniques based on training data associated with the example images 500 of FIG. 5, the dense labels $116_3$ may be generated and in turn used to create the virtual scene $106_3$. As shown, the virtual scenes $106_{2-3}$ may be more compelling and/or cost-efficient to generate than the virtual scene $106_1$ at least in some cases. In particular, different input scenes may yield output scenes with different properties, and the output scenes generated based on image analogy may appear more natural than those generated based on in-painting at least in some cases.

FIG. 7 illustrates example images 700 pertaining to synthesizing new label and aerial images by image analogy, according to one embodiment presented in this disclosure. In particular, the example images 700 pertain to applying image analogies between dense labels and annotated aerial images in order to generate synthetic aerial images based on the new set of annotations. The synthesized images are used as RGB albedo maps for the generated scene in order to introduce a more natural color variation to the object model by adjusting material properties for each instance of the object model in the scene. For instance, an image analogy learned between the sparse labels $112_1$ and the dense labels $116_1$ may be applied in order to generate the synthetic image $104_1$. Further, an image analogy learned between the sparse labels $112_2$ and the dense labels $116_2$ may be applied in order to generate the synthetic image $104_2$. As described above, although virtual landscapes may be readily and conveniently generated for different types of foliage classes, other virtual landscapes, such as those generated for man-made or artificial classes such as roads and buildings, may not necessarily be as readily generated at least in some cases, because such man-made classes exhibit a much stronger and inherent global structure.

FIG. 8 illustrates additional example images 800 pertaining to synthesizing new label and aerial images by image analogy, according to one embodiment presented in this disclosure. In particular, the example images 800 also pertain to applying image analogies between dense labels and annotated aerial images in order to generate synthetic aerial images based on the new set of annotations. These synthesized images are also used as RGB albedo maps for the generated scene in order to introduce a more natural color variation to the object model. For instance, an image analogy learned between the sparse labels $112_1$ and the dense labels $116_1$ may be applied in order to generate the synthetic image $104_1$. Further, an image analogy learned between the sparse labels $112_2$ and the dense labels $116_2$ may be applied in order to generate the synthetic image $104_2$. As described above, although virtual landscapes may be readily and conveniently generated for different types of foliage classes, other virtual landscapes, such as those generated for man-made or artificial classes such as roads and buildings, may not necessarily be as readily generated at least in some cases.

FIG. 9 illustrates example images 900 pertaining to virtual scene generation based on user editing and image analogy, according to one embodiment presented in this disclosure. At least in some embodiments, doing so allows the user to create maps containing regions generated based on image analogies to different scene types, thus allowing the stochastic properties of multiple scenes to be combined. Further, in some embodiments, the user editing may be performed on a scene layout determined from probability maps generated by the application 102. In one embodiment, the user edits the densely labeled maps with new sparse labels, resulting in a new scene. After edits are made to the label image, the application 102 may generate corresponding class density maps by image analogy techniques. Further, scene generation may be based on the class density maps. A corresponding, synthesized aerial view may also be used as an albedo map for the scene, alternating the material properties of each object class to improve the measure of variation in the scene.

In one embodiment, the application 102 receives sparse labels 112 specified based on user input. The application 102 generates dense labels $116_1$ and a synthesized aerial view $104_1$ used as an albedo map for the scene. The application 102 may then generate the virtual scene $106_1$. In some embodiments, the application 102 receives dense labels $116_2$ corresponding to a version of the dense labels $116_1$ that is modified based on user input. The application 102 then generates finalized dense labels $116_3$ and a corresponding synthesized aerial view $104_2$. The application 102 may then generate the virtual scene $106_2$.

FIG. 10 illustrates example images 1000 pertaining to synthesizing missing image regions, according to one embodiment presented in this disclosure. In one embodiment, synthesizing missing image regions is an additional area of application of the techniques disclosed herein. In particular, at least in some embodiments, missing regions may be reconstructed using stochastic transfer, such as to fill in a missing region of an aerial image. In use case scenarios where the aerial images are satellite images, reconstruction may also be applied to fill gaps between different satellite images. As shown, the images 1000 include the aerial image $104_1$. In some embodiments, ground-truth data may be provided, that pertains to with physical scene depicted in the aerial image $104_1$ and that is stored in the form of labels in the image $1002_1$. Such labels are also referred to as ground truth labels.

In one embodiment, ground truth is a remote sensing term that refers to information collected regarding location. Ground truth allows image data to be related to depicted physical features on the ground. Collection of ground-truth data allows calibration of remote-sensing data and aids in interpreting and analyzing what is being sensed. Examples include cartography, meteorology, aerial photograph analysis, satellite imagery, and other techniques involving gathering data at a distance. In particular, ground truth may refer to a process in which a pixel on a satellite image is compared to what is present in reality at a present moment in time, in order to verify the content depicted by the pixel in the image. In the use case scenario of image classification, ground truth allows supervised classification to facilitate determining accuracy of classification performed by an application such as remote sensing software. Doing so may facilitate reduction of classification errors at least in some cases.

Accordingly, the example images 1000 illustrate ground truth aerial images and classification results in conjunction with the result synthesized by image analogy with a reduced region of the image. The result, while not necessarily expected to be identical to the original image, is shown to exhibit similar characteristics, including similar stochastic properties. As shown, the images 100 also include training labels for the top half of the aerial image $104_1$, in the form of the dense labels $116_1$ and the image $1002_2$ containing ground truth labels. In one embodiment, the application 102 generates new label maps by analogy to the training labels, and the new label maps may be in the form of the dense labels $116_2$ and the image $1002_3$ containing ground truth labels. The application 102 may then generate the synthesized aerial view $104_2$. Synthesized aerial views may be used as scene albedo maps in image analogy techniques at least in some cases.

FIG. 11 is a flowchart depicting a method 1100 of scene generation based on aerial images, according to one embodiment presented in this disclosure. As shown, the method 1100 begins at step 1102, wherein the application 102 receives the aerial image 104 of a scene, annotated by the spares labels 112. In one embodiment, the aerial image 104 of the scene is annotated by the sparse labels 112 based on a set of brush strokes specified by user input. In some embodiments, the scene exhibits a stochastic distribution of entities in the scene. At step 1104, the application 102 extracts the feature vectors 114 from the aerial image 104 and based on the sparse labels 112. The extracted feature vectors 114 may then be submitted to a classifier.

Depending on the embodiment, the classifier may be a component of the application 102 or part or all of a separate application operatively connected to the application 102. In one embodiment, the feature vectors 114 represent one or more RGB color model features, one or more hue, saturation value (HSV) color model features, and one or more entropy features. The number and types of features may be tailored to suit the needs of a particular case.

In one embodiment, the classifier is configured to propagate the sparse labels 112 in the depicted scene based on the extracted feature vectors 114 in order to generate the dense labels 116 annotating the aerial image 104. Additionally or alternatively, the classifier may also be configured to generate the density map 118 associated with the aerial image 104. In some embodiments, the classifier may be a pixel-based, forest classifier configured to support distinct classes of landscape type, such as the classes 108. The dense labels 116 may include a label for each pixel in the aerial image 104. The density map 118 may specify probability information including a respective probability of each class at each pixel in the aerial image 104 of the scene.

At step 1106, the application 102 generates the probability maps 120 based on the sparse labels 112, the dense labels 116, and the density map 118. The probability maps 112 may be generated by applying an image analogy between and learned from the sparse labels 112 and the dense labels 116, to additional sets of sparse labels. In one embodiment, the probability maps 120 include a dense, synthesized probability map for each class, in order to reflect one or more stochastic properties of the aerial image 104 of the scene. The application 102 may also determine a scene layout specifying, for each pixel of the aerial image 104 of the scene, the class having the highest probability at the respective pixel.

In one embodiment, the application 102 may optionally, based on the user editing input 122, add, modify, or remove classes of landscape types in the determined scene layout, further described below in conjunction with FIG. 12. Additionally or alternatively, the application 102 may also optionally, based on the user editing input 122, generate maps containing regions of different scene types.

At step 1108, the application 102 generates the virtual scene 106 based on the probability maps 120. In some embodiments, the virtual scene 106 is generated by sampling the probability maps 120 based on a predefined sampling criterion and determining a set of geometric models to insert into the virtual scene based on the sampling. In one embodiment, each geometric model is selected from a set of predefined geometric models. Each predefined geometric model is distinct and associated with a respective class of landscape type. In some embodiments, at least one class of landscape type may be associated with multiple predefined geometric models that are distinct.

In one embodiment, once the virtual scene 106 is generated, the application 102 may output the virtual scene 106 to a requesting entity, such as one from which the aerial image 104 or the user editing input 122 is received. In some embodiments, the method 1100 is a method of stochastic scene generation based on satellite imagery depicted in the aerial images. Other embodiments not departing from the scope of the present disclosure, however, are broadly contemplated. After the step 1108, the method 1100 terminates.

In one embodiment, the manner in which the virtual scene 106 is output may be tailored to suit the needs of a particular case. For example, in some embodiments, the virtual scene is output by transmitting the virtual scene as data to a requesting entity, such as a user or an application. In other embodiments, the virtual scene is output by storing the virtual scene as a file. In yet other embodiments, the virtual scene is presented on a computer display. In still other embodiments, the virtual scene is output via predefined printing techniques such as two-dimensional (2D) printing or three-dimensional (3D) printing. In further embodiments, the virtual scene is output by physically realizing the virtual scene as a physical scene. For example, in some such embodiments, the virtual scene may serve as a blueprint for landscape designers to model the physical landscape after the virtual scene.

FIG. 12 is a flowchart depicting a method 1200 for customizing a scene layout based on user input, according to one embodiment presented in this disclosure. As described above, the scene layout may be determined based on the generated probability maps 120. As shown, the method 1200 begins at step 1202, where the application 102 receives a request 1202 from a user. At step 1204, the application 122 determines a request type of the received request 1202. If the request specifies to add a specified class of landscape type to the scene layout (step 1206), then the application 102 adds the specified class to the scene layout based on user input (step 1212).

Alternatively, if the request specifies to modify a specified class of landscape type in the scene layout (step 1208), then the application 102 modifies the specified class in the scene layout based on user input (step 1214). Still alternatively, if the request specifies to remove a specified class of landscape type from the scene layout (step 1210), then the application 102 removes the specified class from the scene layout (step 1216). After the steps 1212, 1214, or 1216, the method 1200 terminates.

FIG. 13 is a block diagram illustrating components 1300 of the application 102 of FIG. 1, according to one embodiment presented in this disclosure. As shown, the components 1300 include a feature extractor 1302, a classifier 1304, a probability map generator 1306, a user editing module 1308, and a virtual world generation engine 1310. In one embodiment, the feature extractor 1302 is configured to extract feature vectors 114 from the aerial image 104 of a scene, based on the sparse labels 112. The feature extractor 1302 may also submit the extracted feature vectors 114 to the classifier 1304. The classifier 1304 is configured to propagate the spare labels 112 in the scene depicted in the aerial image 104 and based on the extracted feature vectors 114 and the classes 108 of landscape type. In doing so, the classifier 1304 generates the dense labels 116 annotating the aerial image 104 and further generates the density map 118 associated with the aerial image 104. As described above, the classifier may be a pixel-based, forest classifier.

In one embodiment, the probability map generator 1306 is configured to generate the probability maps 120 based on the sparse labels 112, the dense labels 116, and the density map 118. The user editing module 1308 is configured to, based on user input, add, modify, or remove classes of landscape types in a scene layout determined based on the probability maps 120. The virtual world generation engine 1310 is configured to generate and output the virtual scene 106 based on the probability maps 120. In one embodiment, each component 1300 of the application 102 is uniquely identifiable by a respective module name for a respective portion of source code of the application 102, that corresponds to the respective component 1300. The number and types of components 1300 of the application 102 may be tailored to suit the needs of a particular case.

FIG. 14 is a block diagram illustrating a networked system 1400 for scene generation based on aerial images, according to one embodiment presented in this disclosure. The networked system 1400 includes a computer 1402. The computer 1402 may also be connected to other computers via a network 1430. In general, the network 1430 may be a telecommunications network and/or a wide area network (WAN). In a particular embodiment, the network 1430 is the Internet.

The computer 1402 generally includes a processor 1404 connected via a bus 1412 to a memory 1406, a network interface device 1410, a storage 1408, an input device 1414, and an output device 1416. The computer 1402 is generally under the control of an operating system. Examples of operating systems include UNIX, versions of the Microsoft Windows® operating system, and distributions of the Linux® operating system. More generally, any operating system supporting the functions disclosed herein may be used. The processor 1404 is included to be representative of a single CPU, multiple CPUs, a single CPU having multiple processing cores, and the like. Similarly, the memory 406 may be a random access memory. While the memory 1406 is shown as a single entity, it should be understood that the memory 1406 may comprise a plurality of modules, and that the memory 1406 may exist at multiple levels, from high speed registers and caches to lower speed but larger DRAM chips. The network interface device 1410 may be any type of network communications device allowing the computer 1402 to communicate with other computers via the network 1430.

The storage 1408 may be a persistent storage device. Although the storage 1408 is shown as a single unit, the storage 1408 may be a combination of fixed and/or removable storage devices, such as fixed disc drives, solid state drives, floppy disc drives, tape drives, removable memory cards or optical storage. The memory 1406 and the storage 1408 may be part of one virtual address space spanning multiple primary and secondary storage devices.

The input device 1414 may be any device for providing input to the computer 1402. For example, a keyboard and/or a mouse may be used. The output device 1416 may be any device for providing output to a user of the computer 1402. For example, the output device 1416 may be any conventional display screen or set of speakers. Although shown separately from the input device 1414, the output device 1416 and input device 1414 may be combined. For example, a display screen with an integrated touch-screen may be used.

As shown, the memory 1406 of the computer 1402 includes the application 102, and the storage 1408 of the computer 1402 includes the aerial image 104 and the virtual scene 106. In one embodiment, the application 102 is configured to generate the virtual scene 106 based on the aerial image 104 and according to the techniques disclosed herein. Depending on the embodiment, one or more of the aerial image 104 and the virtual scene 106 may be stored on one or more other computers connected to the computer 1402 via the network 1430.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the embodiments presented herein, a user of the application 102 may submit the aerial image 104 and provide the user editing input 122 to be processed by the application 102 executing in the cloud and to generate and store the virtual scene 106 in the cloud. Thus, the user may access and customize the virtual scene 106 from any computing system attached to a network connected to the cloud (e.g., the Internet) and be charged based on the processing environment(s) used.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method of virtual scene generation, the computer-implemented method comprising:

receiving an image depicting a scene and annotated by a sparse set of labels, wherein the scene exhibits a stochastic distribution of entities in the scene;

generating, based on the sparse set of labels, (i) a dense set of labels annotating the image and (ii) a density map associated with the image; and generating a virtual scene based on (i) the dense set of labels and (ii) the density map and by operation of one or more computer processors, wherein the virtual scene is output.

2. The computer-implemented method of claim 1, wherein the depicted scene comprises a depicted landscape, wherein the virtual scene comprises a virtual landscape, wherein the image comprises an aerial image, wherein (i) the dense set of labels annotating the aerial image and (ii) the density map associated with the aerial image are generated by:

extracting one or more feature vectors from the aerial image based on the sparse set of labels; and submitting the one or more feature vectors to a classifier configured to propagate the sparse set of labels in the depicted landscape based on the one or more feature vectors in order to generate the dense set of labels and the density map.

3. The computer-implemented method of claim 2, wherein generating the virtual landscape based on (i) the dense set of labels and (ii) the density map comprises:

generating one or more probability maps based on (i) the sparse set of labels, (ii) the dense set of labels, and (iii) the density map; and generating the virtual landscape based on the one or more probability maps.

4. The computer-implemented method of claim 3, wherein the aerial image of the landscape is annotated by the sparse set of labels based on a set of brush strokes specified by user input, wherein the one or more probability maps are generated by applying an image analogy, between (i) the sparse set of labels and (ii) the dense set of labels, to a next set of sparse labels, wherein the one or more feature vectors represent one or more red, green and blue (RGB) color model features, one or more hue, saturation and value (HSV) color model features, and one or more entropy features;

wherein the virtual landscape is, in respective instances, output via each of: (i) transmitting the virtual landscape as data; (ii) storing the virtual landscape as a file; (iii) on a computer display; (iv) via two-dimensional (2D) printing; (v) via three-dimensional (3D) printing; and (vi) by physically realizing the virtual landscape as a physical landscape.

5. The computer-implemented method of claim 4, wherein the classifier comprises a pixel-based, forest classifier configured to support a plurality of distinct classes of landscape type, wherein each entity in the scene belongs to one of the plurality of distinct classes of landscape type, wherein the aerial image includes a plurality of pixels, wherein the dense set of labels includes a label for each pixel in the aerial image;

wherein the density map specifies probability information including a respective probability of each class at each pixel in the aerial image of the landscape;

wherein the one or more probability maps includes a dense, synthesized probability map for each class, in order to reflect one or more stochastic properties of the aerial image of the landscape, the one or more stochastic properties comprising the stochastic distribution of the entities in the scene;

wherein the one or more probability maps are used in order to determine a scene layout specifying, for each pixel of the aerial image of the landscape, the class having the highest probability at the respective pixel.

6. The computer-implemented method of claim 5, further comprising:

providing an editing application configured to modify the scene layout based on user input, wherein the editing application is configured to independently perform each individual modification selected from:

(i) adding at least one class to the scene layout;

(ii) modifying at least one class specified in the scene layout; and (iii) removing at least one class specified in the scene layout;

wherein the editing application is further configured to generate maps containing regions of different scene types, based on user input via the editing application.

7. The computer-implemented method of claim 6, wherein the virtual landscape is generated by a virtual world generation engine, wherein generating the virtual landscape based on the one or more probability maps comprises:

sampling the probability maps based on a predefined sampling criterion; and determining a set of geometric models to insert into the virtual landscape based on the sampling;

wherein each geometric model is selected from a plurality of predefined, distinct geometric models, wherein each predefined geometric model is associated with a respective class, wherein at least one class is associated with a plurality of predefined, distinct geometric models;

wherein the aerial image is received from a requesting entity, wherein the virtual landscape is output to the requesting entity responsive to the request, wherein the aerial image includes satellite imagery, wherein the method is of stochastic virtual landscape generation based on satellite imagery.

8. A non-transitory computer-readable medium for virtual scene generation and containing a program which, when executed, performs an operation comprising:

receiving an image depicting a scene and annotated by a sparse set of labels, wherein the scene exhibits a stochastic distribution of entities in the scene;

generating, based on the sparse set of labels, (i) a dense set of labels annotating the image and (ii) a density map associated with the image; and generating a virtual scene based on (i) the dense set of labels and (ii) the density map and by operation of one or more computer processors when executing the program, wherein the virtual scene is output.

9. The non-transitory computer-readable medium of claim 8, wherein the depicted scene comprises a depicted landscape, wherein the virtual scene comprises a virtual landscape, wherein the image comprises an aerial image, wherein (i) the dense set of labels annotating the aerial image and (ii) the density map associated with the aerial image are generated by:

extracting one or more feature vectors from the aerial image based on the sparse set of labels; and submitting the one or more feature vectors to a classifier configured to propagate the sparse set of labels in the depicted landscape based on the one or more feature vectors in order to generate the dense set of labels and the density map.

10. The non-transitory computer-readable medium of claim 9, wherein generating the virtual landscape based on the dense set of labels and the density map comprises:

generating one or more probability maps based on (i) the sparse set of labels, (ii) the dense set of labels, and (iii) the density map; and generating the virtual landscape based on the one or more probability maps.

11. The non-transitory computer-readable medium of claim 10, wherein the aerial image of the landscape is annotated by the sparse set of labels based on a set of brush strokes specified by user input, wherein the one or more probability maps are generated by applying an image analogy, between (i) the sparse set of labels and (ii) the dense set of labels, to a next set of sparse labels, wherein the one or more feature vectors represent one or more red, green and blue (RGB) color model features, one or more hue, saturation and value (HSV) color model features, and one or more entropy features;

wherein the virtual landscape is, in respective instances, output via each of: (i) transmitting the virtual landscape as data; (ii) storing the virtual landscape as a file; (iii) on a computer display; (iv) via two-dimensional (2D) printing; (v) via three-dimensional (3D) printing; and (vi) by physically realizing the virtual landscape as a physical landscape.

12. The non-transitory computer-readable medium of claim 11, wherein the classifier comprises a pixel-based, forest classifier configured to support a plurality of distinct classes of landscape type, wherein each entity in the scene belongs to one of the plurality of distinct classes of landscape type, wherein the aerial image includes a plurality of pixels, wherein the dense set of labels includes a label for each pixel in the aerial image;

wherein the density map specifies probability information including a respective probability of each class at each pixel in the aerial image of the landscape;

wherein the one or more probability maps includes a dense, synthesized probability map for each class, in order to reflect one or more stochastic properties of the aerial image of the landscape, the one or more stochastic properties comprising the stochastic distribution of the entities in the scene;

wherein the one or more probability maps are used in order to determine a scene layout specifying, for each pixel of the aerial image of the landscape, the class having the highest probability at the respective pixel.

13. The non-transitory computer-readable medium of claim 12, wherein the operation further comprises:

providing an editing application configured to modify the scene layout based on user input, wherein the editing application is configured to independently perform each individual modification selected from:

(i) adding at least one class to the scene layout;

(ii) modifying at least one class specified in the scene layout; and (iii) removing at least one class specified in the scene layout;

wherein the editing application is further configured to generate maps containing regions of different scene types, based on user input via the editing application.

14. The non-transitory computer-readable medium of claim 13, wherein the virtual landscape is generated by a virtual world generation engine, wherein generating the virtual landscape based on the one or more probability maps comprises:

sampling the probability maps based on a predefined sampling criterion; and determining a set of geometric models to insert into the virtual landscape based on the sampling;

wherein each geometric model is selected from a plurality of predefined, distinct geometric models, wherein each predefined geometric model is associated with a respective class, wherein at least one class is associated with a plurality of predefined, distinct geometric models;

wherein the aerial image is received from a requesting entity, wherein the virtual landscape is output to the requesting entity responsive to the request, wherein the aerial image includes satellite imagery, wherein the method is of stochastic virtual landscape generation based on satellite imagery.

15. A system for virtual scene generation, the system comprising:

one or more computer processors;

a memory containing a program which, when executed by the one or more computer processors, performs an operation comprising:

receiving an image depicting a scene and annotated by a sparse set of labels, wherein the scene exhibits a stochastic distribution of entities in the scene;

generating, based on the sparse set of labels, (i) a dense set of labels annotating the image and (ii) a density map associated with the image; and generating a virtual scene based on (i) the dense set of labels and (ii) the density map, wherein the virtual scene is output.

16. The system of claim 15, wherein the depicted scene comprises a depicted landscape, wherein the virtual scene comprises a virtual landscape, wherein the image comprises an aerial image, wherein (i) the dense set of labels annotating the aerial image and (ii) the density map associated with the aerial image are generated by:

extracting one or more feature vectors from the aerial image based on the sparse set of labels; and submitting the one or more feature vectors to a classifier configured to propagate the sparse set of labels in the depicted landscape based on the one or more feature vectors in order to generate the dense set of labels and the density map.

17. The system of claim 16, wherein generating the virtual landscape based on (i) the dense set of labels and (ii) the density map comprises:

generating one or more probability maps based on (i) the sparse set of labels, (ii) the dense set of labels, and (iii) the density map; and generating the virtual landscape based on the one or more probability maps.

18. The system of claim 17, wherein the aerial image of the landscape is annotated by the sparse set of labels based on a set of brush strokes specified by user input, wherein the one or more probability maps are generated by applying an image analogy, between (i) the sparse set of labels and (ii) the dense set of labels, to a next set of sparse labels, wherein the one or more feature vectors represent one or more red, green and blue (RGB) color model features, one or more hue, saturation and value (HSV) color model features, and one or more entropy features;

wherein the virtual landscape is, in respective instances, output via each of: (i) transmitting the virtual landscape as data; (ii) storing the virtual landscape as a file; (iii) on a computer display; (iv) via two-dimensional (2D) printing; (v) via three-dimensional (3D) printing; and (vi) by physically realizing the virtual landscape as a physical landscape.

19. The system of claim 18, wherein the classifier comprises a pixel-based, forest classifier configured to support a plurality of distinct classes of landscape type, wherein each entity in the scene belongs to one of the plurality of distinct classes of landscape type, wherein the aerial image includes a plurality of pixels, wherein the dense set of labels includes a label for each pixel in the aerial image;

wherein the density map specifies probability information including a respective probability of each class at each pixel in the aerial image of the landscape;

wherein the one or more probability maps includes a dense, synthesized probability map for each class, in order to reflect one or more stochastic properties of the aerial image of the landscape, the one or more stochastic properties comprising the stochastic distribution of the entities in the scene;

wherein the one or more probability maps are used in order to determine a scene layout specifying, for each pixel of the aerial image of the landscape, the class having the highest probability at the respective pixel.

20. The system of claim 19, further comprising:

providing an editing application configured to modify the scene layout based on user input, wherein the editing application is configured to independently perform each individual modification selected from:

(i) adding at least one class to the scene layout;

(ii) modifying at least one class specified in the scene layout; and (iii) removing at least one class specified in the scene layout;

wherein the editing application is further configured to generate maps containing regions of different scene types, based on user input via the editing application.

* * * * *